US012347993B2

(12) United States Patent
Watanabe et al.

(10) Patent No.: US 12,347,993 B2
(45) Date of Patent: Jul. 1, 2025

(54) TERMINAL BLOCK AND CONTROL DEVICE

(71) Applicant: OMRON Corporation, Kyoto (JP)

(72) Inventors: Tomonori Watanabe, Kyoto (JP); Kohei Tanino, Kyoto (JP); Masahiko Kubo, Kyoto (JP); Masaaki Nagano, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 384 days.

(21) Appl. No.: 17/880,088

(22) Filed: Aug. 3, 2022

(65) Prior Publication Data

US 2023/0044689 A1 Feb. 9, 2023

(30) Foreign Application Priority Data

Aug. 5, 2021 (JP) ................................ 2021-129258

(51) Int. Cl.
*H01R 9/24* (2006.01)

(52) U.S. Cl.
CPC ......... *H01R 9/2416* (2013.01); *H01R 9/2425* (2013.01); *H01R 9/2458* (2013.01)

(58) Field of Classification Search
CPC ... H01R 9/2416; H01R 9/2425; H01R 9/2458
USPC .......................................................... 439/709
See application file for complete search history.

(56) References Cited

U.S. PATENT DOCUMENTS 5,299,945 A 4/1994 Norden
6,238,234 B1 * 5/2001 Sedlecky ............. H01R 9/2491 439/936
6,899,554 B1 * 5/2005 Osada .............. H01R 13/62938 439/157
9,774,108 B2 * 9/2017 Takashima ............... H01R 4/52
10,490,916 B1 * 11/2019 Wu ...................... H01R 4/4821

(Continued)

FOREIGN PATENT DOCUMENTS

CN 105680192 A * 6/2016 ............. H01R 35/00
CN 105680192 B 6/2018

(Continued)

OTHER PUBLICATIONS

EPO Extended European Search Report for corresponding EP Application No. 22187917.4; Issued on Dec. 22, 2022.

(Continued)

*Primary Examiner* — Peter G Leigh
(74) *Attorney, Agent, or Firm* — CANTOR COLBURN LLP

(57) ABSTRACT

A terminal block attachable to a control device includes a main body including a wiring connection part to which wiring is connected, a first rotation mechanism unit arranged at a first end in a first direction of the main body, and a second rotation mechanism unit arranged at a second end in the first direction of the main body. The first rotation mechanism unit and the second rotation mechanism unit are configured that the main body is rotatable about an imaginary straight line extending along the first direction with respect to the control device. The wiring connection part is arranged at an end of the main body in a radial direction with respect to the imaginary straight line.

3 Claims, 7 Drawing Sheets

(56) References Cited

U.S. PATENT DOCUMENTS

| | | | | |
|---|---|---|---|---|
| 2005/0221647 | A1* | 10/2005 | Dillon .............. | H01R 13/62977 439/157 |
| 2005/0221653 | A1* | 10/2005 | Dillon .............. | H01R 13/62977 439/331 |
| 2017/0366110 | A1* | 12/2017 | Omari .................. | H01R 9/2475 |
| 2018/0110151 | A1* | 4/2018 | Steinke .................... | H05K 5/02 |
| 2018/0331636 | A1* | 11/2018 | Omari .................. | H01R 9/2475 |

FOREIGN PATENT DOCUMENTS

| | | | | | |
|---|---|---|---|---|---|
| CN | 108206338 | A | * | 6/2018 | ............. H01H 31/02 |
| CN | 208189808 | U | * | 12/2018 | |
| CN | 208423424 | U | * | 1/2019 | |
| CN | 212462071 | U | | 2/2021 | |
| JP | H0262678 | U | | 5/1990 | |
| JP | 2015230637 | A | | 12/2015 | |
| WO | WO-2006110134 | A1 | * | 10/2006 | ....... H01R 13/62916 |
| WO | WO-2021079110 | A1 | * | 4/2021 | ................ G01J 5/02 |

OTHER PUBLICATIONS

JPO Notice of Reasons for Refusal for corresponding JP Application No. 2021-129258; Issued Mar. 5, 2025.

* cited by examiner

TERMINAL BLOCK AND CONTROL DEVICE

CROSS REFERENCES TO RELATED APPLICATIONS

The present invention claims priority under 35 U.S.C. § 119 to Japanese Application, 2021-129258, filed on Aug. 5, 2022, the entire contents of which being incorporated herein by reference.

TECHNICAL FIELD

The present invention relates to a terminal block and a control device that includes the terminal block.

DESCRIPTION OF THE RELATED ART

Patent Document 1 discloses a control device that includes a terminal block.

CITATION LIST

Patent Document 1: Japanese Patent No. 4739084

SUMMARY

In the control device, since a surface of the terminal block is provided with an input/output terminal, a space for routing wiring is necessary on a surface side of the terminal block. As a result, there is a case where a panel in which the control device is housed is not downsized.

An object of the present disclosure is to provide a terminal block with which, when attached to a control device, a panel in which this control device is housed can be downsized, and a control device including this terminal block.

A terminal block of one aspect of the present disclosure is a terminal block attachable to a control device, the terminal block including:

a main body including a wiring connection part to which wiring is connected;

a first rotation mechanism unit arranged at a first end in a first direction of the main body; and a second rotation mechanism unit arranged at a second end in the first direction of the main body, wherein the first rotation mechanism unit and the second rotation mechanism unit are configured that the main body is rotatable about an imaginary straight line extending along the first direction with respect to the control device, and the wiring connection part is arranged at an end of the main body in a radial direction with respect to the imaginary straight line.

A control device of one aspect of the present disclosure includes:

a terminal block of the aspect; and a cover member to which the terminal block is attached in a state where the wiring connection part is exposed to an outside, in which the main body is configured to be rotatable with respect to the cover member.

According to the terminal block, it is possible to achieve a terminal block with which, when attached to a control device, a panel in which this control device is housed can be downsized.

According to the control device, it is possible to achieve a control device with which, when housed in a panel, the terminal block can downsize this panel.

DESCRIPTION OF EMBODIMENTS

An example of the present disclosure will be described below with reference to the accompanying drawings. In the following description, terms indicating specific directions or positions (e.g., terms including "up", "down", "right", and "left") are used as necessary, but these terms are used for facilitating understanding of the present disclosure with reference to the drawings, and the technical scope of the present disclosure is not limited by the meanings of these terms. The following description is merely exemplary in nature, and is not intended to limit the present disclosure, its application object, or its use. Furthermore, the drawings are schematic, and ratios of dimensions and the like do not necessarily match actual ones.

Figure 1:
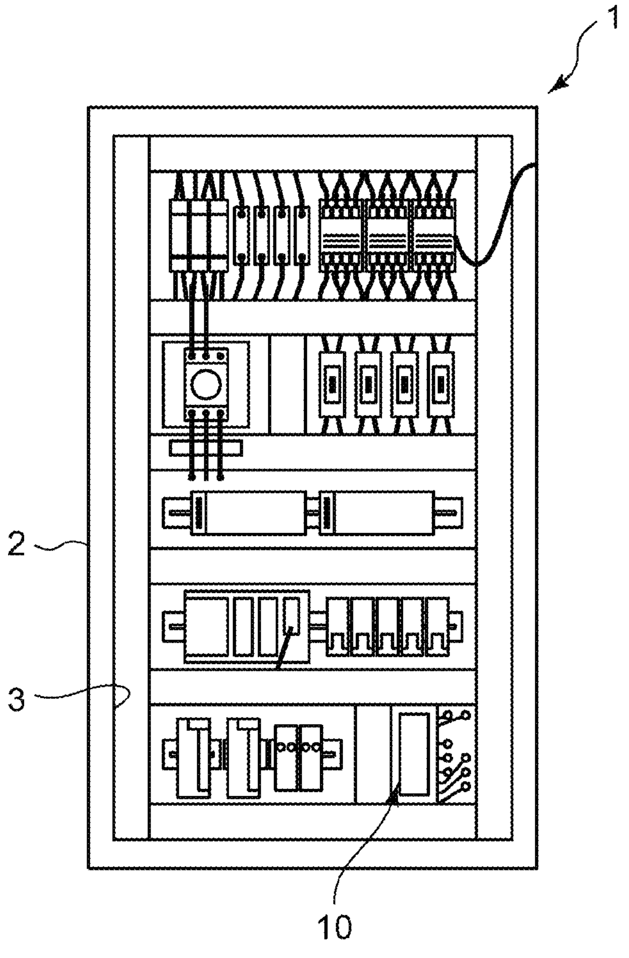
FIG. 1 is a plan view of a panel on which a control device of one embodiment of the present disclosure is arranged.

A control device 10 of one embodiment of the present disclosure is attached to a panel 1 illustrated in FIG. 1, for example. The panel 1 includes a casing 2 provided with an opening 3 opened and closed by a lid (not illustrated). The control device 10 is arranged inside the casing 2.

Figure 2:
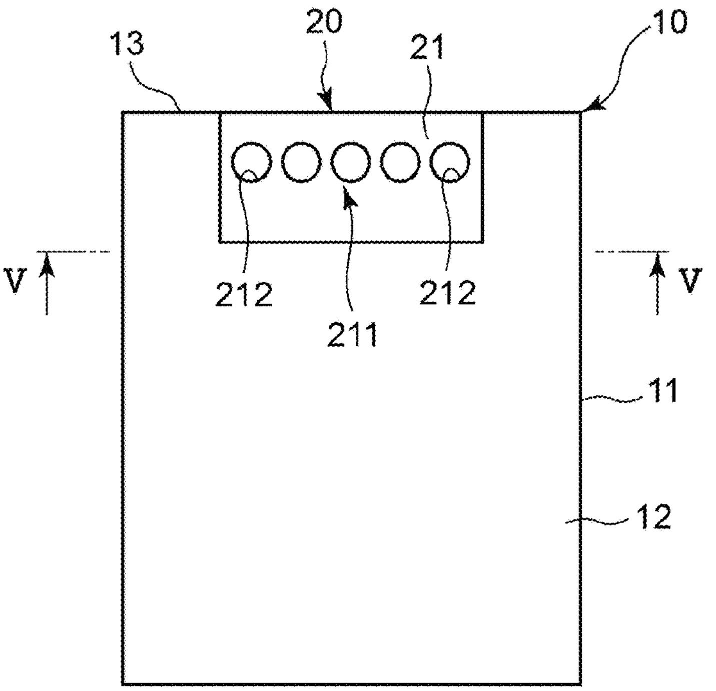
FIG. 2 is a plan view of the control device of one embodiment of the present disclosure.

As illustrated in FIG. 2, the control device 10 includes a cover member 11 and a terminal block 20. The terminal block 20 is configured to be rotatable with respect to the cover member 11. In the present embodiment, the cover member 11 has a substantially rectangular parallelepiped box shape. The terminal block 20 is attached to the cover member 11 in a state of being exposed to an outside of the cover member 11 from a front surface 12 and a side surface 13 of the cover member 11.

Figure 3:
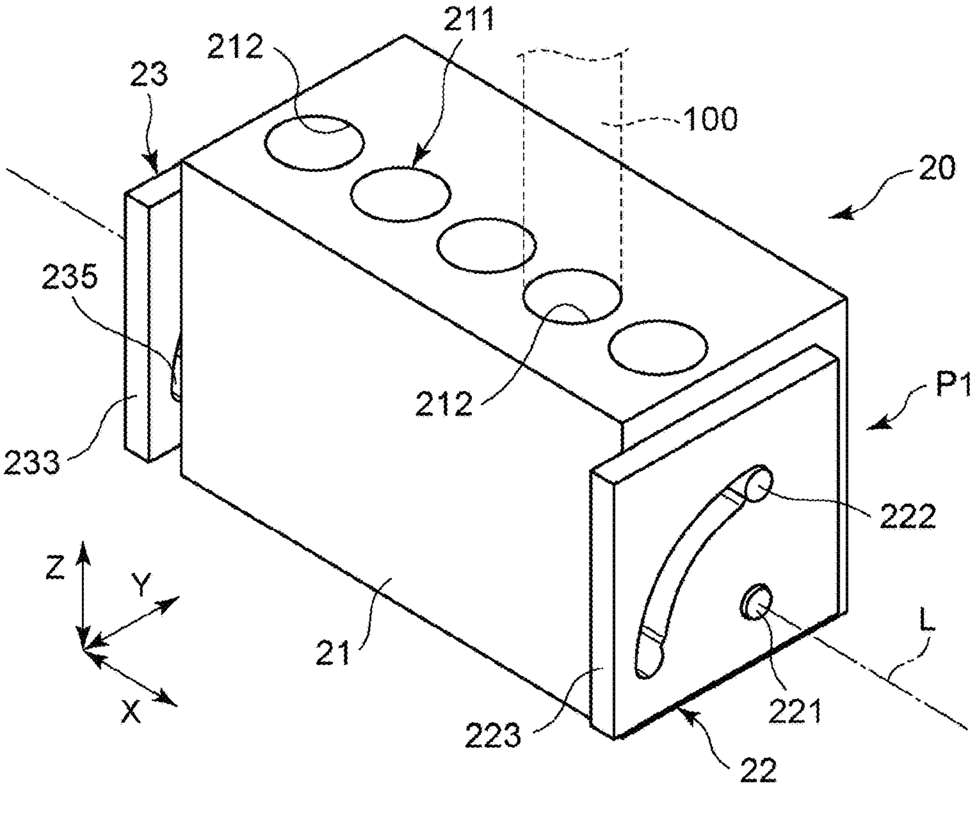
FIG. 3 is a perspective view illustrating a terminal block attached to a control device of FIG. 2.

As illustrated in FIG. 3, the terminal block 20 includes a main body 21, a first rotation mechanism unit 22, and a second rotation mechanism unit 23.

As an example, the main body 21, which has a substantially rectangular parallelepiped shape, includes a wiring connection part 211. The wiring connection part 211 includes a plurality of wiring holes 212 arranged side by side at equal intervals along the first direction (for example, in an X direction). Each of the wiring holes 212 has a substantially circular shape and is configured to be able to house wiring 100. That is, the wiring 100 is connected to the wiring connection part 211 via each of the wiring holes 212. In a state where the terminal block 20 is attached to the control device 10, the wiring connection part 211 of the main body 21 is exposed to an outside of the control device 10 (see FIG. 2).

Figure 4:
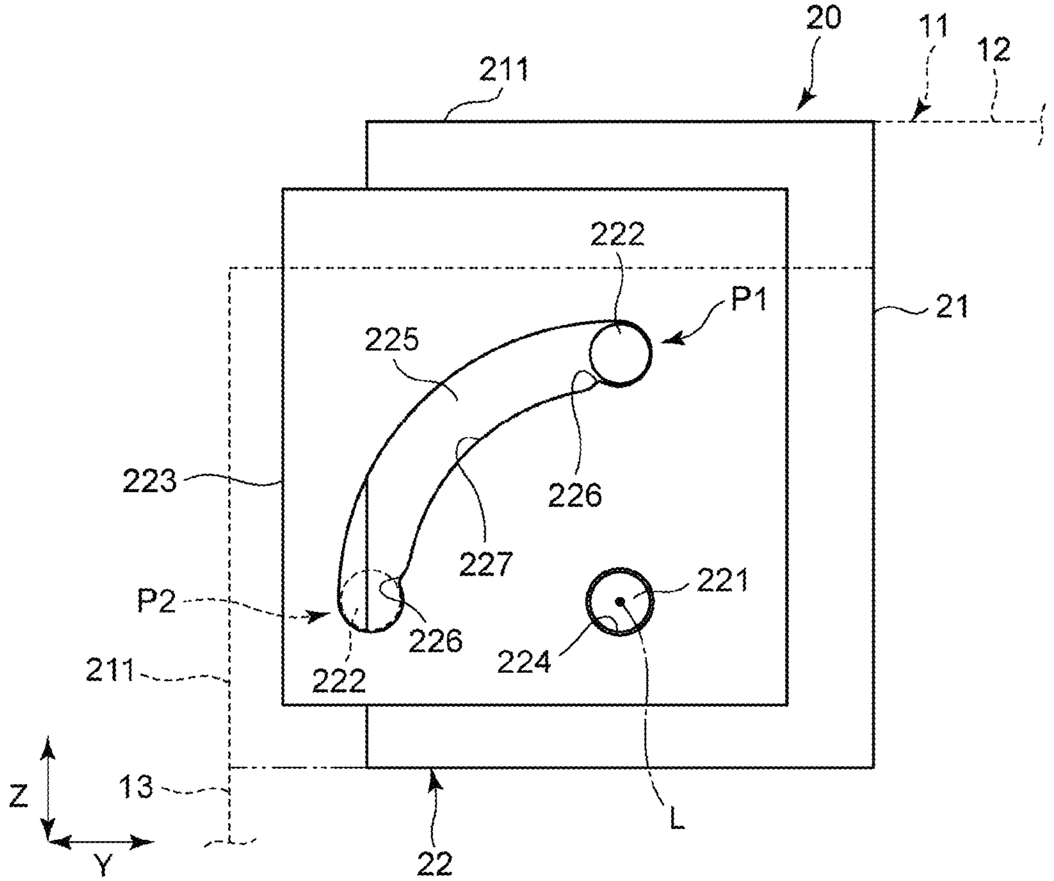
FIG. 4 is a side view of the terminal block of FIG. 3.

The first rotation mechanism unit 22 and the second rotation mechanism unit 23 are configured to be rotatable about an imaginary straight line L extending on the main body 21 along the first direction X with respect to the cover member 11 of the control device 10. In the present embodiment, by the first rotation mechanism unit 22 and the second rotation mechanism unit 23, the main body 21 rotates between a first position P1 (see FIG. 4) where the wiring connection part 211 is exposed from the front surface 12 of the cover member 11 and a second position P2 (see FIG. 4) where the wiring connection part 211 is exposed from the side surface 13 of the cover member 11. The wiring connection part 211 is arranged in the radial direction with respect to the imaginary straight line L of the main body 21 (hereinafter, referred to as radial direction).

As illustrated in FIG. 3, the first rotation mechanism unit 22 is arranged at one end (first end) of the main body 21 (in FIG. 3, the right end of the main body 21) in the first direction X. In the present embodiment, the first rotation mechanism unit 22 includes a first protrusion 221, a second protrusion 222, and a first rotation support part 223.

The first protrusion 221 has a substantially cylindrical shape as an example. A substantial center of the first protrusion 221 is arranged on the imaginary straight line L. In the present embodiment, the first protrusion 221 is provided at one end of the main body 21 in the first direction X, and extends in the first direction X and in a direction away from the other end (second end) of the main body 21 (in FIG. 3, the left end of the main body 21) in the first direction X.

The second protrusion 222 has a substantially cylindrical shape as an example and has substantially the same length in the first direction X as that of the first protrusion 221. In the present embodiment, the second protrusion 222 is provided at one end of the main body 21 in the first direction X. The second protrusion 222 extends in the first direction X and in a direction away from the other end of the main body 21 in the first direction X. The second protrusion 222 is arranged at an interval from the first protrusion 221 in the radial direction with respect to the imaginary straight line L.

The first rotation support part 223, which has a substantially rectangular plate shape as an example, includes a first housing hole 224 for housing the first protrusion 221 and a first guide groove 225 for housing the second protrusion 222.

The first housing hole 224 has a substantially circular shape slightly larger in diameter than the first protrusion 221 as an example. A substantial center of the first housing hole 224 is arranged on the imaginary straight line L.

The first guide groove 225 is arranged at an interval from the first housing hole 224 in the radial direction. The first guide groove 225 extends in a circumferential direction with respect to the imaginary straight line L (hereinafter, referred to as circumferential direction) and houses the second protrusion 222 movably in the circumferential direction. In the present embodiment, the first guide groove 225 has an about ¼ arc shape as viewed along the first direction X, and penetrates the first rotation support part 223 in the first direction X. Both ends of the first guide groove 225 in the circumferential direction are each provided with a holding protrusion 226. Each of the holding protrusions 226 extends in the radial direction from a side surface 227 extending in the circumferential direction of the first guide groove 225. Each of the holding protrusions 226 is configured to be able to hold the second protrusion 222 at one end or the other end in the circumferential direction.

As illustrated in FIG. 3, the second rotation mechanism unit 23 is arranged at the other end of the main body 21 in the first direction X. In the present embodiment, the second rotation mechanism unit 23 includes a third protrusion 231 (see FIG. 5), a fourth protrusion 232 (see FIG. 5), and a second rotation support part 233.

The third protrusion 231 has substantially the same size as that of the first protrusion 221 as an example. That is, the third protrusion 231 has a substantially cylindrical shape, and a substantial center of the third protrusion 221 is arranged on the imaginary straight line L. In the present embodiment, the third protrusion 231 is provided at the other end of the main body 21 in the first direction X. The third protrusion 231 extends in the first direction X and in a direction away from one end of the main body 21 in the first direction X.

The fourth protrusion 232 has substantially the same size as that of the second protrusion 222 as an example. That is, the fourth protrusion 232 has a substantially cylindrical shape and has substantially the same length in the first direction X as that of the third protrusion 231. In the present embodiment, the fourth protrusion 232 is provided at the other end of the main body 21 in the first direction X. The fourth protrusion 232 extends in the first direction X and in a direction away from one end of the main body 21 in the first direction X. The fourth protrusion 232 is arranged at an interval from the third protrusion 231 in the radial direction with respect to the imaginary straight line L.

The second rotation support part 233, which has a substantially rectangular plate shape as an example, includes a second housing hole (not illustrated) for housing the third protrusion 231 and a second guide groove 235 for housing the fourth protrusion 232. In the present embodiment, the second rotation support part 233 has substantially the same shape and size as those of the first rotation support part 223.

The second housing hole has substantially the same shape and size as those of the first housing hole 224 (see FIG. 4) as an example. That is, the second housing hole has a substantially circular shape slightly larger in diameter than the third protrusion 231, and a substantial center of the second housing hole is arranged on the imaginary straight line L.

The second guide groove 235 is arranged at an interval from the second housing hole in the radial direction. The second guide groove 235 extends in the circumferential direction and houses the fourth protrusion 232 movably in the circumferential direction. In the present embodiment, the second guide groove 235 has substantially the same shape and size as those of the first guide groove 225. That is, the second guide groove 235 has about ¼ arc shape as viewed along the first direction X, and penetrates the second rotation support part 233 in the first direction X. Both ends of the second guide groove 235 in the circumferential direction are each provided with a holding protrusion (not illustrated). Each of the holding protrusions extends in the radial direction from a side surface extending in the circumferential direction of the second guide groove 235. Each of the holding protrusions is configured to be able to hold the fourth protrusion 232 at one end or the other end in the circumferential direction.

Figure 5:
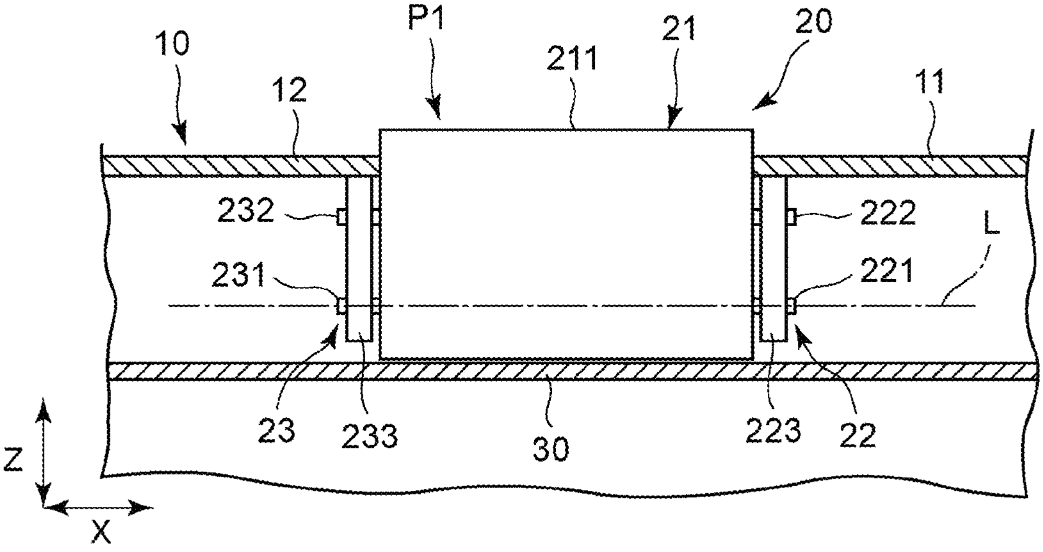
FIG. 5 is a cross-sectional view taken along line V-V of FIG. 2.

As illustrated in FIG. 5, in the present embodiment, the first rotation support part 223 and the second rotation support part 233 are fixed to the cover member 11 of the control device 10. Inside the cover member 11 is provided with a substrate 30 supported by the cover member 11 and electrically connected to the terminal block 20. As an example, when a main body unit 21 is positioned at the first position P1, the substrate 30 is arranged more inside the cover member 11 than the terminal block 20.

The terminal block 20 can exhibit the following effects.

The terminal block 20 includes the main body 21 including the wiring connection part 211 to which the wiring is connected, the first rotation mechanism unit 22 arranged at one end of the main body 21 in the first direction, and the second rotation mechanism unit 23 arranged at the other end of the main body 21 in the first direction. The first rotation mechanism unit 22 and the second rotation mechanism unit 23 are configured that the main body 21 is rotatable about the imaginary straight line extending along the first direction X with respect to the control device 10. The wiring connection part 211 is arranged at one end of the main body 21 in the radial direction with respect to the imaginary straight line. With such configuration, when attached to the control device 10, the terminal block 20 can be rotated in accordance with the direction in which the wiring is routed. As a result, in the panel 1 in which the control device 10 is housed, it is possible to save the space for routing the wiring and achieve the terminal block capable of downsizing the panel 1.

The terminal block 20 can arbitrarily adopt any one or more of the plurality of configurations below. That is, any one or more of the plurality of configurations below can be arbitrarily deleted when included in the embodiment and can be arbitrarily added when not included in the embodiment. By adopting such configuration, it is possible to more reliably achieve a terminal block capable of downsizing the panel 1.

The first rotation mechanism unit 22 includes the first protrusion 221, the second protrusion 222, and the first rotation support part 223. The first protrusion 221 extends in the first direction and in a direction away from the other end of the main body 21 in the first direction. The second protrusion 222 extends in the first direction and in a direction away from the other end of the main body 21 in the first direction. The second protrusion 222 is arranged at an interval from the first protrusion 221 in the radial direction with respect to the imaginary straight line. The first rotation support part 223 is fixed to the control device 10. The first rotation support part 223 includes the first housing hole 224 and the first guide groove 225. The first housing hole 224 is arranged on the imaginary straight line and houses the first protrusion 221. The first guide groove 225 is arranged at an interval from the first housing hole 224 in the radial direction with respect to the imaginary straight line. The first guide groove 225 extends in the circumferential direction with respect to the imaginary straight line. The first guide groove 225 houses the second protrusion 222 movably in the circumferential direction. The second rotation mechanism unit 23 includes the third protrusion 231, the fourth protrusion 232, and the second rotation support part 233. The third protrusion 231 extends in the first direction and in a direction away from one end of the main body 21 in the first direction. The fourth protrusion 232 extends in the first direction and in a direction away from one end of the main body 21 in the first direction. The fourth protrusion 232 is arranged at an interval from the third protrusion 231 in the radial direction with respect to the imaginary straight line. The second rotation support part 233 is fixed to the control device 10 and has the second housing hole and the second guide groove 235. The second housing hole is arranged on the imaginary straight line and houses the third protrusion 231. The second guide groove 235 is arranged at an interval from the second housing hole in the radial direction with respect to the imaginary straight line. The second guide groove 235 extends in the circumferential direction with respect to the imaginary straight line. The second guide groove 235 houses the fourth protrusion 232 movably in the circumferential direction.

The first rotation support part 22 and the second rotation support part 23 are fixed to the cover member 11 of the control device 10. The first protrusion 221 and the second protrusion 222 are provided at one end of the main body 21 in the first direction, and the third protrusion 231 and the fourth protrusion 232 are provided at the other end of the main body 21 in the first direction.

The first guide groove 225 includes a holding protrusion 226 that is provided at each of ends in the circumferential direction and extends in the radial direction from a side surface extending in the circumferential direction, the holding protrusion 226 holding the second protrusion at one of the ends in the circumferential direction.

The control device 10 can exhibit the following effects.

With the terminal block 20, it is possible to achieve the control device 10 capable of downsizing this panel 1 when housed inside the panel 1.

The terminal block 20 can also be configured as follows.

The main body 21 may adopt any configuration including the wiring connection part 211.

It is sufficient that the first rotation mechanism unit 22 and the second rotation mechanism unit 23 is configured to be rotatable about the imaginary straight line extending on the main body 21 along the first direction X with respect to the control device 10.

Figure 6:
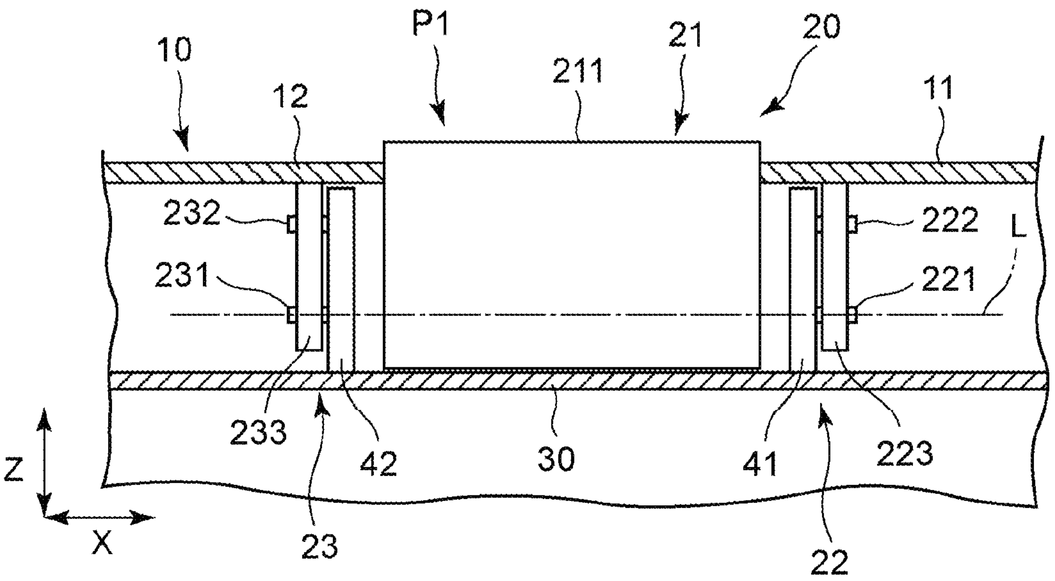
FIG. 6 is a cross-sectional view illustrating a first modification of the terminal block of FIG. 3.

For example, the first rotation mechanism unit 22 and the second rotation mechanism unit 23 may be configured as illustrated in FIG. 6. In FIG. 6, the first rotation mechanism unit 22 includes a first fixing member 41, and the second rotation mechanism unit 23 includes a second fixing member 42. In the control device 10 of FIG. 6, as an example, when the main body unit 21 is positioned at the first position P1, the substrate 30 is arranged more inside the cover member 11 than the terminal block 20.

The first fixing member 41 is configured to be fixable to the substrate 30, and extends from the substrate 30 in the radial direction and in a direction approaching the cover member 11 (for example, upward in a Z direction in FIG. 6). The first protrusion 221 and the second protrusion 22 are fixed to a surface on the opposite side to a surface opposing the main body 21 in the first direction X of the first fixing member 41. The second fixing member 42 is configured to be fixable to the substrate 30 and extends from the substrate 30 in the radial direction and in a direction approaching the cover member 11. The third protrusion 231 and the fourth protrusion 232 are fixed to a surface on the opposite side to a surface opposing the main body 21 in the first direction X of the second fixing member 42.

Figure 7:
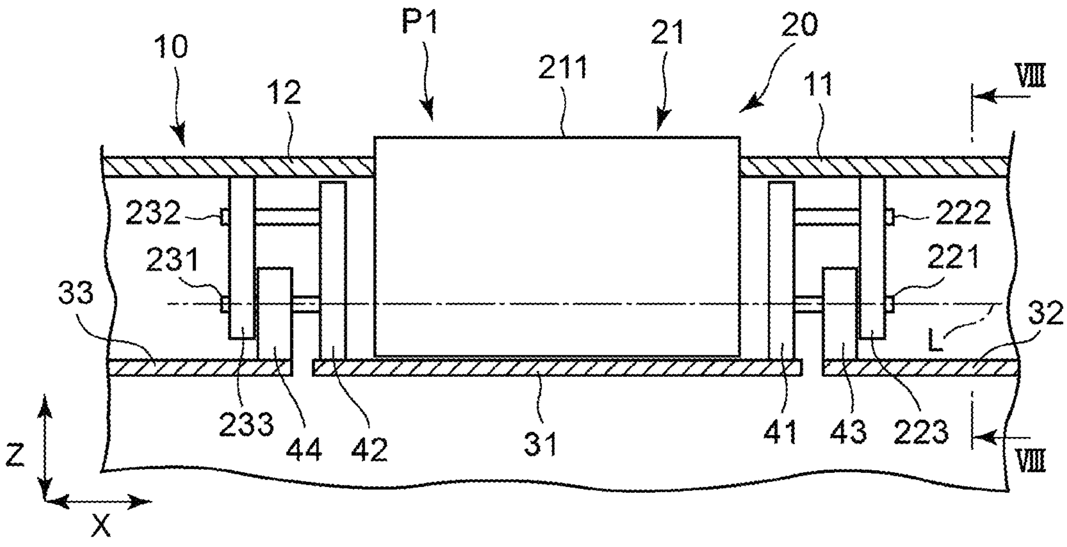
FIG. 7 is a cross-sectional view illustrating a second modification of the terminal block of FIG. 3.
Figure 8:
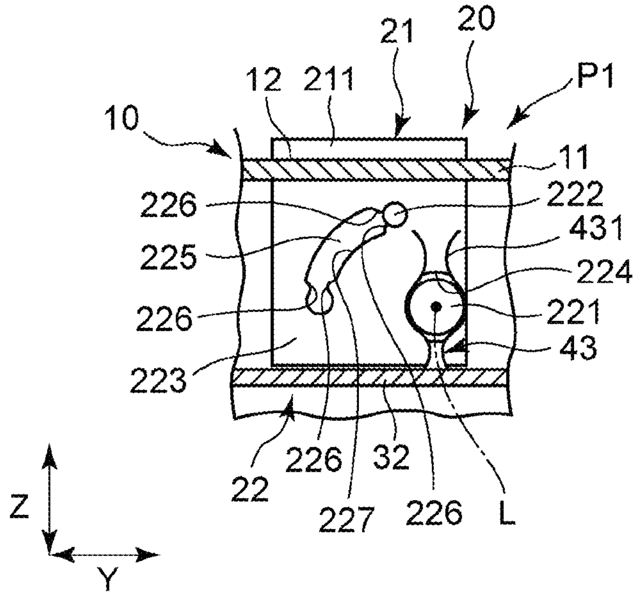
FIG. 8 is a cross-sectional view taken along line VIII-VIII of FIG. 7.

For example, the first rotation mechanism unit 22 and the second rotation mechanism unit 23 may be configured as illustrated in FIG. 7 and FIG. 8. In FIG. 7 and FIG. 8, the first rotation mechanism unit 22 includes the first fixing member 41 and a first connection member 43, and the second rotation mechanism unit 23 includes the second fixing member 42 and a second connection member 44. The first protrusion 221, the first fixing member 41, the third protrusion 231, and the second fixing member 42 each have conductivity.

In the control device 10 of FIG. 7 and FIG. 8, three substrates (hereinafter, referred to as first substrate 31, second substrate 32, and third substrate 33) are arranged inside the cover member 11. The first substrate 31, the second substrate 32, and the third substrate 33 are configured separately from one another and are supported by the cover member 11. The first substrate 31 is arranged on the other end side (for example, the lower side in the Z direction in FIG. 7) of the terminal block 20 in the radial direction. The first fixing member 41 is fixed to one end of the first substrate 31 in the first direction X (for example, the right end of FIG. 7), and the second fixing member 42 is fixed to the other end of the first substrate 31 in the first direction X (for example, the left end of FIG. 7). The second substrate 32 is arranged on one end side in the first direction X with respect to the first substrate 31 with a gap from the first substrate 31. The third substrate 33 is arranged on the other end side in the first direction X with respect to the first substrate 31 with a gap from the first substrate 31.

The first connection member 43 has conductivity and is arranged between the first rotation support part 223 and the first fixing member 41 in the first direction X. The first connection member 43 connects the first protrusion 221 and the second substrate 32. The first substrate 31 and the second substrate 32 are electrically connected via the first protrusion 221, the first fixing member 41, and the first connection member 43. The second connection member 44 has conductivity and is arranged between the second rotation support part 233 and the second fixing member 42 in the first direction X. The second connection member 44 is connected to the third protrusion 231 and the third substrate 33. The first substrate 31 and the third substrate 33 are electrically connected via the third protrusion 231, the second fixing member 42, and the second connection member 44.

As the first connection member 43, any configuration that can be connected to the first protrusion 221 and the second substrate 32 may be adopted. For example, the first connection member 43 of FIG. 8 includes a pair of elastic members 431 that elastically deform in the radial direction and in a direction along the second substrate 32 (for example, in a Y direction) and can sandwich the first protrusion 221. The second connection member 44 may also be configured similarly to the first connection member 43.

The first rotation support part 223 of FIG. 8 includes a pair of holding protrusions 226 protruding in directions approaching each other, each holding protrusion being provided at both ends of the first guide groove 225. This makes it possible to easily hold the main body 21 at the first position P1 or the second position P2. The second rotation support part 233 may also be configured similarly to the first rotation support part 223.

Figure 9:
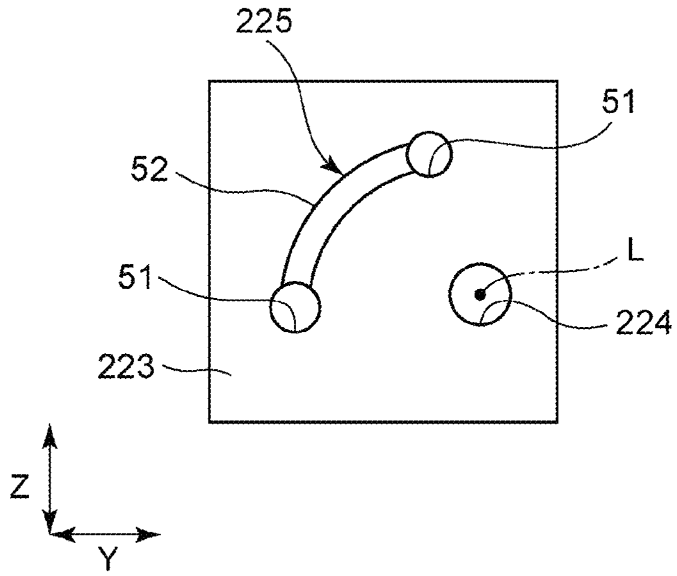
FIG. 9 is a side view illustrating a third modification of the terminal block of FIG. 3.

For example, the first rotation support part 223 may be configured as illustrated in FIG. 9. In the first rotation support part 223 of FIG. 9, the first guide groove 225 includes through holes 51 provided at each of both ends in the circumferential direction and a bottomed groove part 52 connected to the two through holes 51. In this case, since the main body 21 is held at the first position P1 or the second position P2 by housing the second protrusion 222 in the through hole 51, the holding protrusion 226 can be omitted. The second rotation support part 233 may also be configured similarly to the first rotation support part 223.

Figure 10:
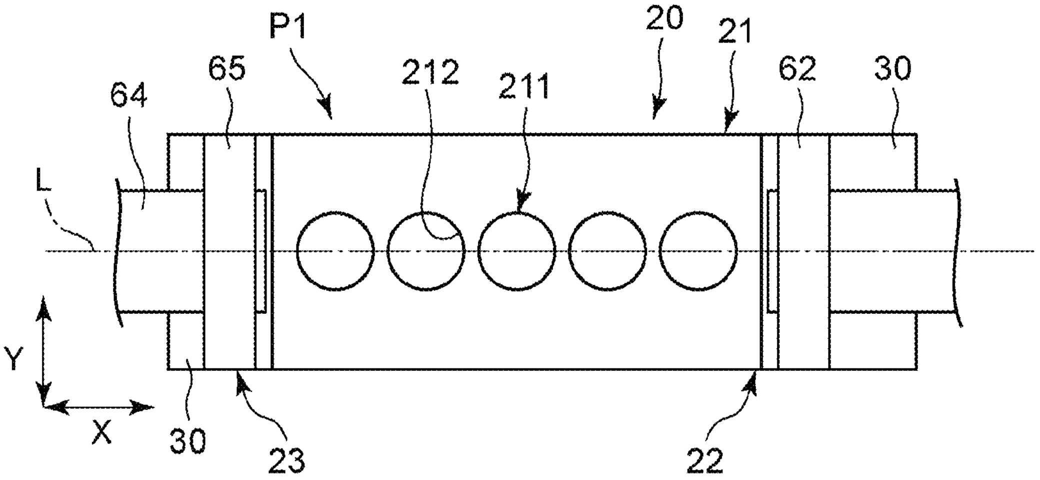
FIG. 10 is a plan view illustrating a fourth modification of the terminal block of FIG. 3.
Figure 11:
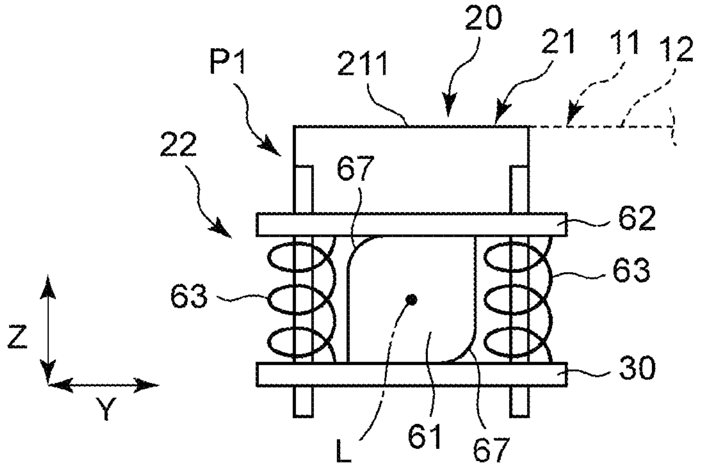
FIG. 11 is a side view illustrating the terminal block of FIG. 10 in a state where a main body is positioned at a first position.
Figure 12:
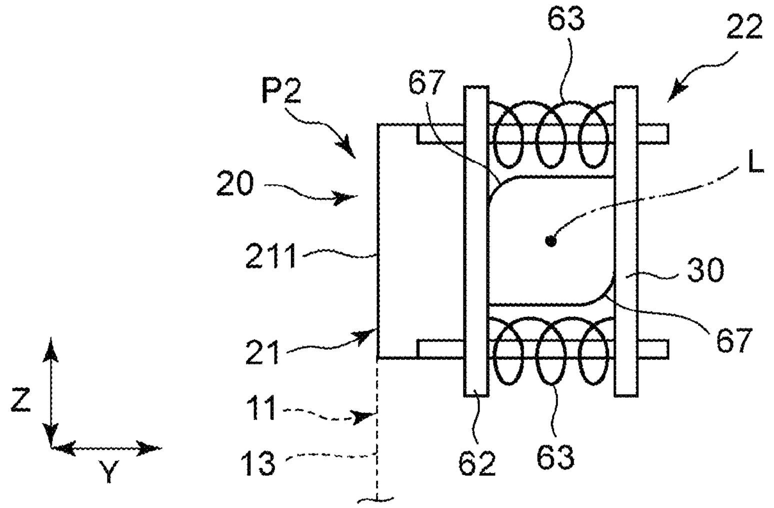
FIG. 12 is a side view illustrating the terminal block of FIG. 10 in a state where the main body is positioned at a second position.

For example, the first rotation mechanism unit 22 and the second rotation mechanism unit 23 may be configured as illustrated in FIGS. 10 to FIG. 12. In FIGS. 10 to FIG. 12, the first rotation mechanism unit 22 includes a first rotation shaft part 61, a first sandwiching member 62, and a first biasing member 63, and the second rotation mechanism unit 23 includes a second rotation shaft part 64, a second sandwiching member 65, and a second biasing member. In the control device 10 of FIGS. 10 to 12, the substrate 30 is connected to an end of the main body 21 on an opposite side to the wiring connection part 211 in the radial direction. FIG. 11 and FIG. 12 illustrate the first rotation mechanism unit 22.

The first rotation shaft part 61 is arranged on the substrate 30 and extends along the first direction X. The first rotation shaft part 61 is fixed to the cover member 11. The first sandwiching member 62 has a substantially rectangular plate shape as an example and is arranged to be able to sandwich the first rotation shaft part 61 together with the substrate 30 in the radial direction. As an example, the first biasing member 63 is configured by two coil springs arranged on both sides of the first rotation shaft part 61 in the radial direction and a direction along the substrate 30 (for example, in the Y direction). The first biasing member 63 is connected to the substrate 30 and the first sandwiching member 62 and biases the first sandwiching member 62 in a direction approaching the substrate 30.

The second rotation shaft part 64 is arranged on the substrate 30 and extends along the first direction X. The second rotation shaft part 64 is arranged coaxially with the first rotation shaft part 61 and is fixed to the cover member 11. The second sandwiching member 65 has a substantially rectangular plate shape as an example and is arranged to be able to sandwich the second rotation shaft part 64 together with the substrate 30 in the radial direction. As an example, the second biasing member is configured by coil springs arranged on both sides of the second rotation shaft part 64 in the radial direction and a direction along the substrate 30. The second biasing member is connected to the substrate 30 and the second sandwiching member 65 and biases the second sandwiching member 65 in a direction approaching the substrate 30.

The terminal block 20 of FIG. 10 to FIG. 12 is held at the first position P1 or the second position P2 by the biasing forces of the first biasing member 62 and the second biasing member 66.

As an example, as illustrated in FIG. 11 and FIG. 12, each of the first rotation shaft part 61 and the second rotation shaft part 64 has a quadrangular shape in which a pair of corner parts 67 opposing each other are curved when viewed along the first direction X. The curved corner parts facilitate rotation of the main body 21 about the imaginary straight line L.

As illustrated in FIGS. 6 to FIG. 12, the terminal block 20 of the present disclosure can downsize the panel 1 with various configurations.

The first rotation mechanism unit 22 and the second rotation mechanism unit 23 are not limited to have the configurations same as each other and may have configurations different from each other. For example, the first rotation mechanism unit 22 and the second rotation mechanism unit 23 may be configured such that the first rotation mechanism unit 22 has the configuration illustrated in FIG. 6 and the second rotation mechanism unit 23 has the configuration illustrated in FIG. 7 and FIG. 8.

As the wiring connection part 211, any configuration to which wiring can be connected may be adopted. In other words, the terminal block 20 may be, for example, a screw connection type terminal block, or a push-in connection type terminal block.

Various embodiments in the present disclosure have been described above in detail with reference to the drawings, and finally, various aspects of the present disclosure will be described. In the following description, as an example, reference numerals are also added.

A terminal block 20 of a first aspect of the present disclosure is a terminal block 20 attachable to a control device, the terminal block including:

a main body 21 including a wiring connection part 211 to which wiring is connected;

a first rotation mechanism unit 22 arranged at a first end in a first direction of the main body 21; and a second rotation mechanism unit 23 arranged at a second end in the first direction of the main body 21, in which the first rotation mechanism unit 22 and the second rotation mechanism unit 23 are configured that the main body 21 is rotatable about an imaginary straight line extending along the first direction with respect to the control device, and the wiring connection part 211 is arranged at an end of the main body 21 in a radial direction with respect to the imaginary straight line.

In a terminal block 20 of a second aspect of the present disclosure, the first rotation mechanism unit 22 includes a first protrusion 221 that extends in the first direction and in a direction away from the second end of the main body 21 in the first direction, a second protrusion 222 that extends in the first direction and in a direction away from the second end of the main body 21 in the first direction, and is arranged at an interval from the first protrusion 221 in the radial direction with respect to the imaginary straight line, and a first rotation support part 223 that includes a first housing hole 224 that is arranged on the imaginary straight line and houses the first protrusion 221, and a first guide groove 225 that is arranged at an interval from the first housing hole 224 in the radial direction, extends in a circumferential direction with respect to the imaginary straight line, and houses the second protrusion 222 movably in the circumferential direction, the first rotation support part 223 being fixed to the control device, and the second rotation mechanism unit 23 includes a third protrusion 231 that extends in the first direction and in a direction away from the first end of the main body 21 in the first direction, a fourth protrusion 232 that extends in the first direction and in a direction away from the first end of the main body 21 in the first direction, and is arranged at an interval from the third protrusion 231 in the radial direction with respect to the imaginary straight line, and a second rotation support part 233 that includes a second housing hole that is arranged on the imaginary straight line and houses the third protrusion 231, and a second guide groove 235 that is arranged at an interval from the second housing hole in the radial direction, extends in the circumferential direction, and houses the fourth protrusion 232 movably in the circumferential direction, the second rotation support part 233 being fixed to the control device.

In a terminal block 20 of a third aspect of the present disclosure, the control device includes a cover member to which the first rotation support part 22 and the second rotation support part 23 are fixed, the first protrusion 221 and the second protrusion 222 are provided at the first end of the main body 21 in the first direction, and the third protrusion 231 and the fourth protrusion 232 are provided at the second end of the main body 21 in the first direction.

In a terminal block 20 of a fourth aspect of the present disclosure, the control device includes a cover member to which the first rotation support part 22 and the second rotation support part 23 are fixed, the cover member having a box-shape, and a substrate that is supported by the cover member inside the cover member and electrically connected to the terminal block 20, the first rotation mechanism unit 22 includes a first fixing member 41 that is configured to be fixable to the substrate and extends from the substrate in the radial direction and in a direction approaching the cover member, the first fixing member 41 including a surface on an opposite side to a surface opposing the main body 21 in the first direction to which the first protrusion 221 and the second protrusion 222 are fixed, and the second rotation mechanism unit 23 includes a second fixing member 42 that is configured to be fixable to the substrate and extends from the substrate in the radial direction and in a direction approaching the cover member, the second fixing member 42 including a surface on an opposite side to a surface opposing the main body 21 in the first direction to which the third protrusion 231 and the fourth protrusion 232 are fixed.

In a terminal block 20 of a fifth aspect of the present disclosure, the control device includes a first substrate that is the substrate, and a second substrate that is separate from the first substrate, the first rotation mechanism unit 22 includes the first protrusion 221 having conductivity, the first fixing member 41 having conductivity, and a connection member 43 that connects the first protrusion 221 and the second substrate, the connection member 43 having conductivity, and the first substrate and the second substrate are electrically connected via the first protrusion 221, the first fixing member 41, and the connection member.

In a terminal block 20 of a sixth aspect of the present disclosure, the first guide groove 225 includes a holding protrusion 226 that is provided at each of ends in the circumferential direction and extends in the radial direction from a side surface extending in the circumferential direction, the holding protrusion 226 holding the second protrusion at one of the ends in the circumferential direction.

In a terminal block 20 of a seventh aspect of the present disclosure, the first guide groove 225 includes through holes 51 that are provided at each of ends in the circumferential direction and each penetrates the first rotation support part 223 in the first direction, and a bottomed groove part 52 that is connected to the through holes 51 at the ends in the circumferential direction and opens on a surface on an opposite side to a surface opposing the main body 21 in the first direction.

In a terminal block 20 of an eighth aspect of the present disclosure, the control device includes a cover member to which the first rotation support part 223 and the second rotation support part 233 are fixed, the cover member having a box-shape, and a substrate supported by the cover member inside the cover member and electrically connected to the terminal block 20, the first rotation mechanism unit 22 includes a first rotation shaft part 61 arranged on the substrate and extending along the first direction, a first sandwiching member 62 sandwiching the first rotation shaft part 61 together with the substrate in the radial direction, and a first biasing member 63 connected to the substrate and the first sandwiching member 62, the first biasing member 63 biasing the first sandwiching member 62 in a direction approaching the substrate, and the second rotation mechanism unit 23 includes a second rotation shaft part 64 arranged on the substrate and extending along the first direction, a second sandwiching member 65 sandwiching the second rotation shaft part 64 together with the substrate in the radial direction, and a second biasing member 66 connected to the substrate and the second sandwiching member 65, the second biasing member 66 biasing the second sandwiching member 65 in a direction approaching the substrate.

In a terminal block 20 of a ninth aspect of the present disclosure, each of the first rotation shaft part 61 and the second rotation shaft part 64 has a quadrangular shape in which a pair of opposing corner parts 67 are curved as viewed along the first direction.

A control device 10 of a tenth aspect of the present disclosure includes:

a terminal block 20 of the aspect; and a cover member 11 to which the terminal block 20 is attached in a state where the wiring connection part 211 is exposed to an outside, in which the main body 21 is configured to be rotatable with respect to the cover member 11.

By appropriately combining any embodiments or modifications among the various embodiments or modifications, it is possible to achieve respective effects they have. Combinations of embodiments, combinations of examples, or combinations of embodiments and examples are possible, and combinations of features in different embodiments or examples are also possible.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The terminal block of the present disclosure may be applied to a control device arranged in a control panel, for example.

The control device of the present disclosure may be applied to a control panel, for example.

REFERENCE SIGNS LIST

1 panel
2 casing
3 opening
10 control device
11 cover member
12 front surface
13 side surface
20 terminal block
21 main body
211 wiring connection part
212 wiring hole
22 first rotation mechanism unit
221 first protrusion
222 second protrusion
223 first rotation support part
224 first housing hole
225 first guide groove
226 holding protrusion
227 side surface
23 second rotation mechanism unit
231 third protrusion
232 fourth protrusion
233 second rotation support part
235 second guide groove
30 substrate
31 first substrate
32 second substrate
33 third substrate
41 first fixing member
42 second fixing member
43 first connection member
44 second connection member
51 through hole
52 bottomed groove part
61 first rotation shaft part
62 first sandwiching member
63 first biasing member
64 second rotation shaft part
65 second sandwiching member
67 corner part

What is claimed is:

1. A control device, comprising:

a terminal block including:

a main body including a wiring connection part to which wiring is connected;

a first rotation mechanism unit arranged at a first end in a first direction of the main body; and a second rotation mechanism unit arranged at a second end in the first direction of the main body; and a cover member to which the terminal block is attached in a state where the wiring connection part is exposed to an outside, wherein the main body is configured to be rotatable with respect to the cover member, the first rotation mechanism unit and the second rotation mechanism unit are configured that the main body is rotatable about an imaginary straight line extending along the first direction with respect to the control device, and the wiring connection part is arranged at an end of the main body in a radial direction with respect to the imaginary straight line, wherein the first rotation mechanism unit includes:

a first protrusion that extends in the first direction and in a direction away from the second end of the main body in the first direction;

a second protrusion that extends in the first direction and in a direction away from the second end of the main body in the first direction, and is arranged at an interval from the first protrusion in the radial direction with respect to the imaginary straight line; and a first rotation support part that includes a first housing hole that is arranged on the imaginary straight line and houses the first protrusion, and a first guide groove that is arranged at an interval from the first housing hole in the radial direction, extends in a circumferential direction with respect to the imaginary straight line, and houses the second protrusion movably in the circumferential direction, the first rotation support part being fixed to the control device, the second rotation mechanism unit includes:

a third protrusion that extends in the first direction and in a direction away from the first end of the main body in the first direction;

a fourth protrusion that extends in the first direction and in a direction away from the first end of the main body in the first direction, and is arranged at an interval from the third protrusion in the radial direction with respect to the imaginary straight line; and a second rotation support part that includes a second housing hole that is arranged on the imaginary straight line and houses the third protrusion, and a second guide groove that is arranged at an interval from the second housing hole in the radial direction, extends in the circumferential direction, and houses the fourth protrusion movably in the circumferential direction, the second rotation support part being fixed to the control device, the first rotation support part and the second rotation support part are fixed to the cover member, the first protrusion and the second protrusion are provided at the first end of the main body in the first direction, and the third protrusion and the fourth protrusion are provided at the second end of the main body in the first direction.

2. The terminal block according to claim 1 wherein the first guide groove includes a holding protrusion that is provided at each of ends in the circumferential direction and extends in the radial direction from a side surface extending in the circumferential direction, the holding protrusion holding the second protrusion at one of the ends in the circumferential direction.

3. The terminal block according to claim 1, wherein the first guide groove includes a through hole that is provided at each of ends in the circumferential direction and penetrates the first rotation support part in the first direction, and a bottomed groove part that is connected to the through holes at the ends in the circumferential direction and opens on a surface on an opposite side to a surface opposing the main body in the first direction.

* * * * *